United States Patent
Hammer et al.

(10) Patent No.: US 6,436,281 B2
(45) Date of Patent: Aug. 20, 2002

(54) APPARATUS FOR TREATING WASTEWATER FROM A CHEMICAL-MECHANICAL POLISHING PROCESS USED IN CHIP FABRICATION

(75) Inventors: Jürgen Hammer, Radeberg; Andre Richter, Neustadt/Sachsen; Werner Kraus, Teublitz; Heinz-Dieter Petermann, Stuttgart, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/829,871

(22) Filed: Apr. 10, 2001

Related U.S. Application Data

(62) Division of application No. 09/428,582, filed on Oct. 28, 1999, which is a continuation of application No. PCT/DE98/01164, filed on Apr. 27, 1998.

(30) Foreign Application Priority Data

Apr. 28, 1997 (DE) .......................................... 197 17 865

(51) Int. Cl.⁷ .............................................. B01D 36/02
(52) U.S. Cl. ...................... 210/96.2; 210/259; 210/433; 451/60; 451/88
(58) Field of Search ............................ 210/96.2, 195.2, 210/254, 257.2, 259, 138, 333.01, 321.69, 636, 433; 451/60, 88, 446

(56) References Cited

U.S. PATENT DOCUMENTS

| | | | |
|---|---|---|---|
| 4,915,844 A | | 4/1990 | Imamura et al. |
| 4,917,123 A | * | 4/1990 | McConnell et al. |
| 5,182,023 A | | 1/1993 | O'Connor et al. |
| 5,460,723 A | * | 10/1995 | Bourbigot et al. |
| 5,647,989 A | * | 7/1997 | Hayashi et al. |
| 5,664,990 A | * | 9/1997 | Adams et al. ................ 451/60 |
| 6,077,437 A | * | 6/2000 | Hayashi et al. |

FOREIGN PATENT DOCUMENTS

| | | |
|---|---|---|
| DE | 37 82 205 T2 | 10/1992 |
| EP | 0 585 036 A1 | 3/1994 |
| JP | 08-115892 | 4/1987 |

OTHER PUBLICATIONS

International Publication No. WO 95/35261 (Yorita et al.), dated Dec. 28, 1995.
Patent Abstracts of Japan No. 62–083086 (Kazunori), dated Apr. 16, 1987.

* cited by examiner

*Primary Examiner*—Joseph W. Drodge
(74) *Attorney, Agent, or Firm*—Laurence A. Greenberg; Werner H. Stemer; Gregrory L. Mayback

(57) ABSTRACT

Wastewater from a chemical-mechanical polishing process (CMP) used in semiconductor chip fabrication has hitherto been, and is still being, discharged into the public sewage system after chemical neutralization and sedimentation. This has the drawback that water consumption is considerable. It is therefore an object of the invention to reduce the total amount of wastewater produced that has to be discharged. This is achieved by the wastewater to be treated being subjected to an ultra-filtration. This allows the treated CMP wastewater to be reused within the plant. In particular, it can be recycled in order again to recover therefrom deionized water of a very high purity for operational purposes, e.g. for CMP.

4 Claims, 5 Drawing Sheets

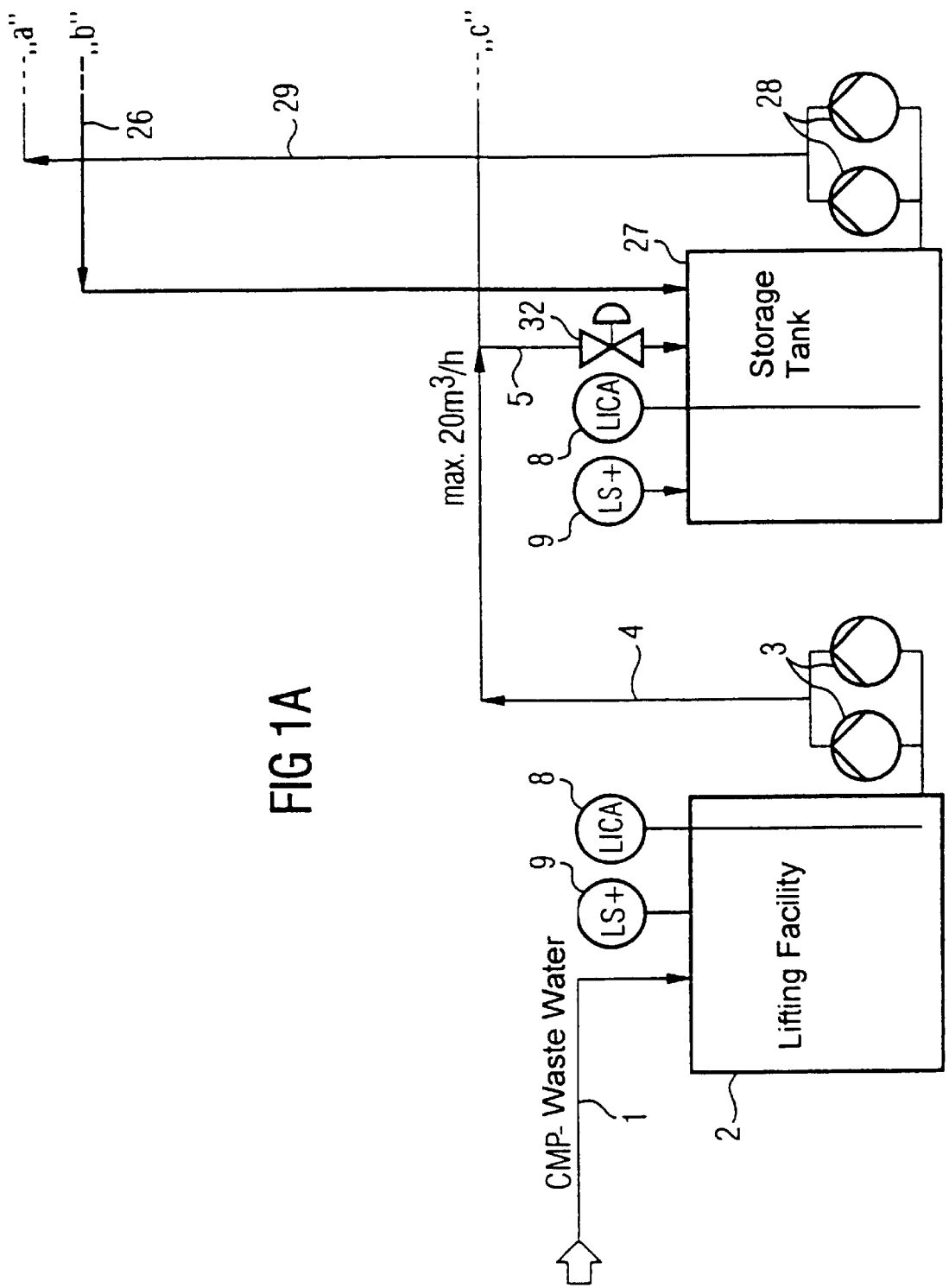

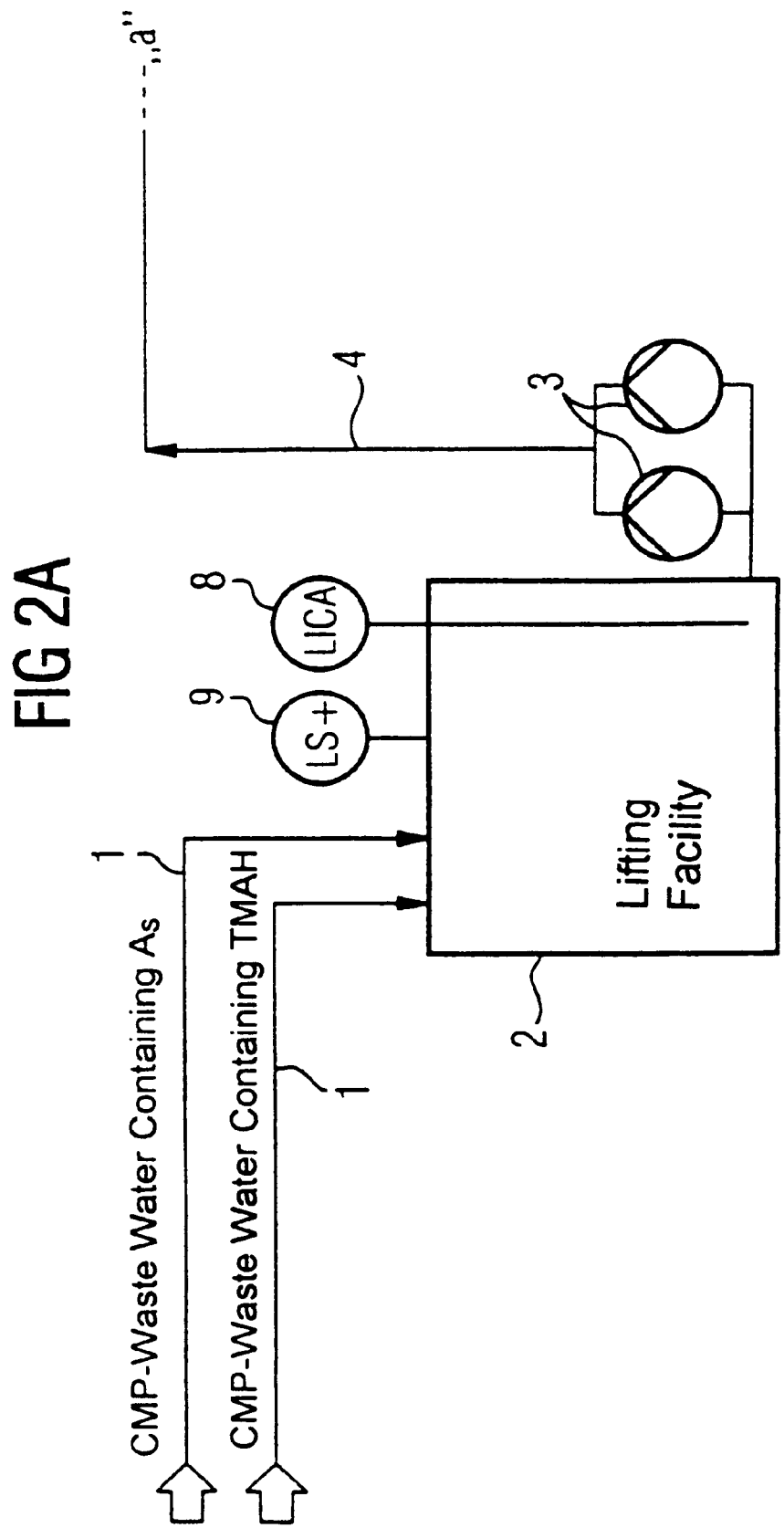

APPARATUS FOR TREATING WASTEWATER FROM A CHEMICAL-MECHANICAL POLISHING PROCESS USED IN CHIP FABRICATION

CROSS-REFERENCE TO RELATED APPLICATION

This is a division of U.S. application Ser. No. 09/428,582, filed Oct. 28, 1999, which was a continuation of copending International Application PCT/DE98/01164, filed Apr. 27, 1998, which designated the United States.

BACKGROUND OF THE INVENTION

FIELD OF THE INVENTION

The invention relates to an apparatus for treating wastewater from a chemical-mechanical polishing process used in chip fabrication.

Chemical-mechanical polishing processes (CMP) are used in semiconductor chip fabrication to planarize the semiconductor wafer or to keep it planar. This involves treating the wafer with a polishing tool with the addition of a polishing fluid, the so-called slurry. Typically, deionized water with a very high purity serves as a basis for the polishing fluid, which is added to chemical additives and/or particles having an abrasive effect.

After the chemical-mechanical polishing process, the polishing fluid running off will, as well as its constituents, additionally contain abraded material from the polishing process and further contaminants. As a result, the polishing fluid is laden with a series of particles having an abrasive effect and a series of chemically active substances. In the case of a wastewater load of about 30 m$^3$/h, the following constituents may be present, for example, in the polishing fluid.

| | | |
|---|---|---|
| TMAH (3% strength) | = | ~80 l/h |
| SiO$_2$ | = | ~17.2 kg/h |
| Al$_2$(SO$_4$)$_3$ (8% strength) | = | ~9 l/h |
| NH$_4$OH (2% strength) | = | ~14 l/h |
| Fe(NO$_3$) (49% strength) | = | ~7 l/h |
| Al$_2$O$_3$ | = | ~0.6 kg/h |
| As | = | ~35 mg/h |
| HNO$_3$ | = | ~250 g/h |
| TiN$_x$ | = | ~100 g/h |
| H$_3$PO$_4$ | = | ~100 g/h |
| KOH | = | ~250 g/h |
| HF | = | ~0.1 g/h |
| H$_2$O$_2$ | = | ~0.1 g/h |
| W | = | ~100 g/h |
| Al | = | ~100 g/h |
| (NH$_4$)$_2$S$_2$O$_8$ | = | ~150 g/h |
| HCl | = | ~100 g/h |
| NH$_4$F | = | ~100 g/h |
| Monoethylene glycol | = | ~100 g/h |
| Ammonium perfluoralcylsulfonate | = | ~100 g/h |
| (NH$_4$)Ce(NO$_3$)$_6$ | = | ~100 g/h |

Up till now, the wastewater from a chemical-mechanical polishing process used in chip fabrication has been neutralized chemically, coarse particle contamination is removed by sedimentation, and the wastewater thus treated is passed to the public sewage system and is thus lost for operational purposes.

The known procedure has the drawback that water consumption is considerable; in relatively large chip fabrication plants it is a few m$^3$/h. This amount of water discharged into the public sewage system must be replaced by fresh deionized water of a very high purity, thus entailing corresponding costs of providing the deionized water. Moreover, the wastewater coming from a chemical-mechanical polishing process in chip fabrication causes an additional load to the water treatment plants of the public sewage system, which is environmentally undesirable.

SUMMARY OF THE INVENTION

It is accordingly an object of the invention to provide an apparatus for treating wastewater from a chemical-mechanical polishing process used in chip fabrication that overcome the above-mentioned disadvantages of the prior art methods and devices of this general type, which permit a reduction in the total amount of wastewater produced and to be discharged. In particular, it is desirable, as a development of the invention, for the treated wastewater to be capable of being recycled subsequently to produce deionized water.

With the foregoing and other objects in view there is provided, in accordance with the invention, a method for treating wastewater from a chemical-mechanical polishing process used in chip fabrication, the wastewater containing particles having an abrasive effect and chemically active substances attacking the particles having the abrasive effect, which includes removing rapidly the particles having the abrasive effect from the wastewater via ultra-filtration in an ultra-filtration facility such the particles are not substantially dissolved by the chemically active substances present in the wastewater and resulting in ultrafiltrated wastewater.

The use of the ultra-filtration facility allows the wastewater from a chemical-mechanical polishing process (hereinafter simply referred to as CMP wastewater) to be regenerated in such a way as to allow the treated wastewater to be reused within the plant or to be passed to the public sewage system without significant pollution. Ultra-filtration for the purpose of the patent application results in that particles having a diameter of more than 0.4 μm are essentially filtered out. Moreover, it is preferred for particles having a diameter of more than 0.1 μm to be essentially filtered out by the ultra-filtration. In the case of relatively low to medium particle contamination, ultra-filtration is adequate to achieve such a degree of purity of the treated wastewater as to allow the treated wastewater to be subsequently recycled to produce deionized water.

In the process, the CMP wastewater is preferably subjected so rapidly to ultra-filtration, that the particles having an abrasive effect, for example the SiO$_2$ particles, which are present in the CMP wastewater are essentially not dissolved by the chemically active substances, for example KOH, present in the CMP wastewater. If this is ensured, the substances present in the particles can be almost completely removed from the CMP wastewater by the ultra-filtration.

It is further preferred for the particles filtered out in the ultra-filtration facility to be removed from the ultra-filtration facility by back flushing. In the process, it is moreover preferred for the back flushing to occur at sufficiently short intervals for essentially no reaction in the ultra-filtration facility to take place between the particles retained in the ultra-filtration facility and the chemically active substances present in the CMP wastewater.

In the case of organic or inorganic contaminants it may be necessary also to provide a reverse-osmosis stage and/or a nano-filtration stage in addition to the ultra-filtration stage. Reverse osmosis here essentially serves to remove organic-chemistry carbon compounds from the CMP wastewater to be treated. Nano-filtration for the purpose of this patent application results in that particles having a diameter of more than 0.05 μm are essentially filtered out. Moreover, it is preferred for particles having a diameter of more than 0.01 μm to be essentially filtered out by the nano-filtration.

It is particularly economical for the ultra-filtration of the wastewater to be treated to be followed by the measurement of one or more parameter values of the ultrafiltrated wastewater. The ultrafiltrated wastewater, depending on the parameter values measured, to be either passed on directly or passed to a reverse-osmosis facility or a nano-filtration facility or both. Thus, the further, more expensive cleaning stages of reverse osmosis and nano-filtration are used only if they are actually required according to the parameter values measured. Relevant parameter values include, in particular, the conductivity of the treated wastewater, its total content of organic carbon, its particle content or its level of silicon oxides or ammonia $NH_3$.

Preferably, the purified wastewater is subsequently again fed to a regeneration facility for producing deionized water, thus resulting in a closed water cycle.

Other features which are considered as characteristic for the invention are set forth in the appended claims.

Although the invention is illustrated and described herein as embodied in an apparatus for treating wastewater from a chemical-mechanical polishing process used in chip fabrication, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 1a and 1b are diagrammatic, block diagrams showing a first exemplary embodiment of an apparatus containing an ultra-filtration facility according to the invention; and FIGS. 2a, 2b, and 2c are block diagrams showing a second exemplary embodiment of the apparatus additionally containing a reverse-osmosis facility and/or a nano-filtration facility.

DESCRIPTION OF THE PREFERRED EMBODIMENTS

Figure 1B:
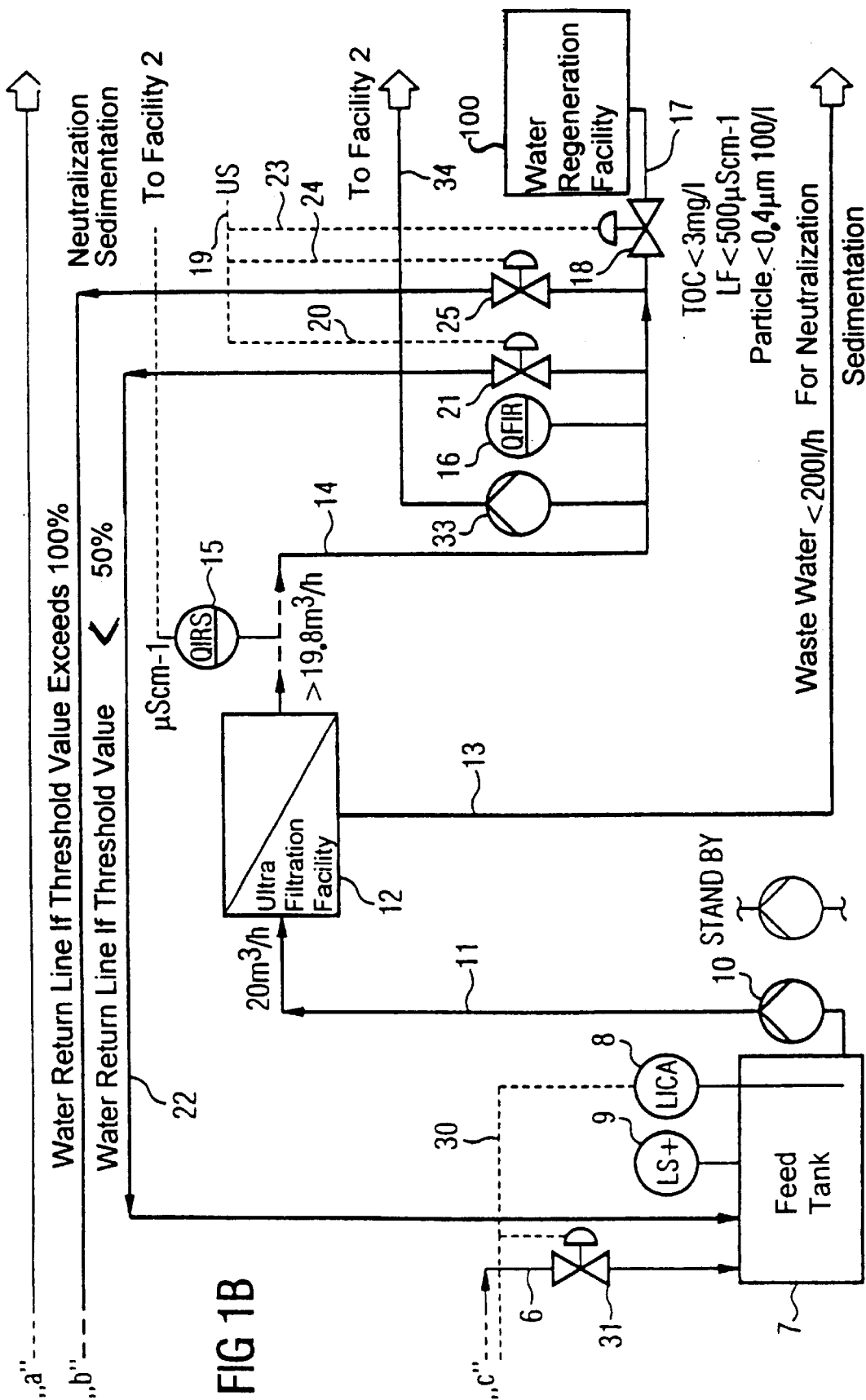

In all the figures of the drawing, sub-features and integral parts that correspond to one another bear the same reference symbol in each case. Referring now to the figures of the drawing in detail and first, particularly, to FIGS. 1a and 1b thereof, there is shown a block diagram of a wastewater treatment apparatus which, in particular, is for CMP wastewater containing solely particle contamination. At the right side, FIG. 1b connects to FIG. 1a, the corresponding junctions of the conduits designated by "a", "b", "c" respectively.

Via an input conduit 1, the CMP wastewater is fed to a lifting facility 2. Via conduits 4, 6 the CMP wastewater then passes into a feed tank 7. Both the lifting facility 2 and the feed tank 7 are equipped with fill level measurement equipment 8 and limit switches 9.

A pump 10 delivers the CMP wastewater from the feed tank 7 via a conduit 11 to an ultra-filtration facility 12. In the ultra-filtration facility 12 of FIGS. 1a and 1b, essentially all particles having a diameter of more than 0.2 μm are filtered out.

In this configuration, the conduits 1, 4 and 6, the lifting facility 2, the feed tank 7 and the pump 10 are of such a configuration that the particles, for example $SiO_2$ particles, which are present in the CMP wastewater and have an abrasive effect are essentially not dissolved by the chemically active substances, for example KOH, present in the CMP wastewater.

Under standard process conditions, up to over 99% of the CMP wastewater stream entering the ultra-filtration facility 12 leaves the ultra-filtration facility 12 as a filtered permeate via a conduit 14, although the percentages achievable in practice do depend, in specific situations, on wastewater load and type and degree of pollution. The conductivity of the permeate in the conduit 14 is measured by a control system sensor 15 and a measuring sensor 16. In the exemplary embodiment of FIGS. 1a, 1b the requirement is for the conductivity value of the purified wastewater in the conduit 14 to be less than 500 μS/cm. If this limit is complied with, the purified wastewater will pass, via the conduit 14, a valve 18 and an adjoining output conduit 17, to a water regeneration facility 100 of a known configuration and is there recycled to produce deionized water which, for example, can be reused in the CMP process.

At regular intervals, the particles filtered out are removed from the ultra-filtration facility 12 by back-flushing. To this end, the inflow of the CMP water from the conduit 11 is briefly stopped, and already filtered wastewater from the conduit 14 flows in the reverse direction to the ultra-filtration facility 12. The concentrate filtered off is then passed, via a conduit 13, to a neutralization and sedimentation facility operating in a standard manner (not shown in FIGS. 1a, 1b). The intervals between individual back-flushing operations chosen in this context are sufficiently short for essentially no reaction to take place in the ultra-filtration facility 12, during normal operation, between the particles retained in the ultra-filtration facility 12 and the chemically active substances present in the CMP wastewater.

As previously mentioned, as a rule there is a requirement for the conductivity value of the purified wastewater in the conduit 14 to be less than 500 μS/cm. If the conductivity limit of 500 μS/cm is exceeded by less than 50%, a converter actuator 19 controlled by a control system sensor 15 opens, via a control line 20, a valve 21 and passes the ultra-filtrated wastewater from the conduit 14 via a conduit 22 back to the feed tank 7. At the same time, the valve 18 between the conduit 14 and the output conduit 17 is closed via a control line 23.

In the event of the conductivity limit is exceeded by more than 100%, the converter actuator 19 controlled by the control system sensor 15 opens, via a control line 24, a valve 25 so that the wastewater from the ultra-filtration facility 12 in the conduit 14 is passed to a storage tank 27 via a conduit 26. Such a severe breach of the limit will largely occur in the event of a rupture of the filter membrane in the ultra-filtration facility 12. The valve 18 between the conduit 14 and the output conduit 17 remains closed.

The wastewater in the storage tank 27 can be passed on, via a set of pumps 28 and an output conduit 29, to be neutralized and sedimented in a known manner. The storage tank 27 is likewise equipped with the fill level measuring device 8 and the limit switch 9.

The invention further envisages that the fill level measuring device 8 of the feed tank 7, upon too high a fill level in the feed tank 7 being reached, shall, via a control line 30, close a valve 31 in the conduit 6 and at the same time open a valve 32 in a conduit 5 which runs to the storage tank 27 and connects to the conduit 4, so that CMP wastewater to be purified, which flows in from the lifting facility 2 via the set of pumps 3 and the conduit 4 will reach the storage tank 27 and then be pumped off via the set of pumps 28 and the output conduit 29.

Figure 2B:
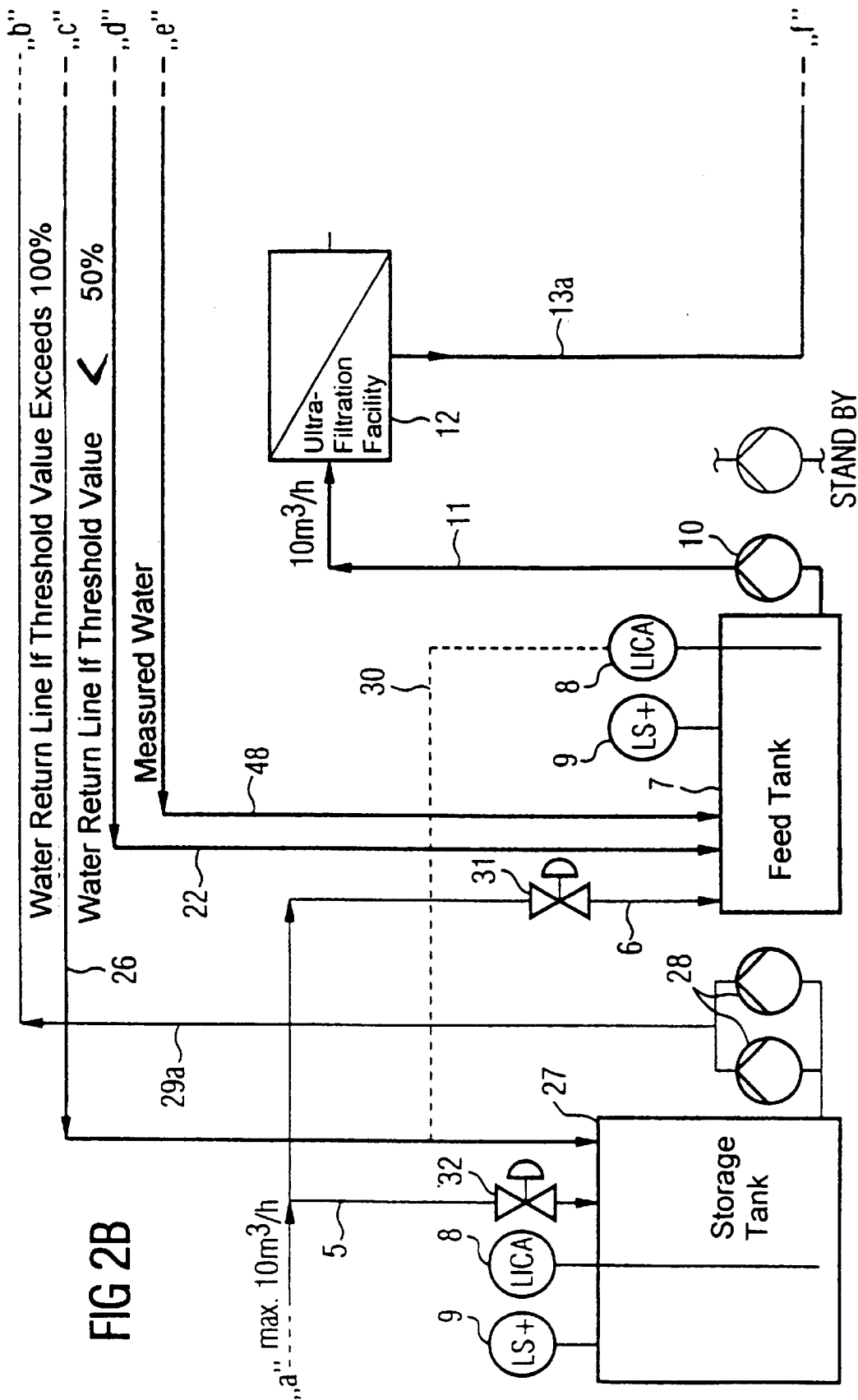
Figure 2C:
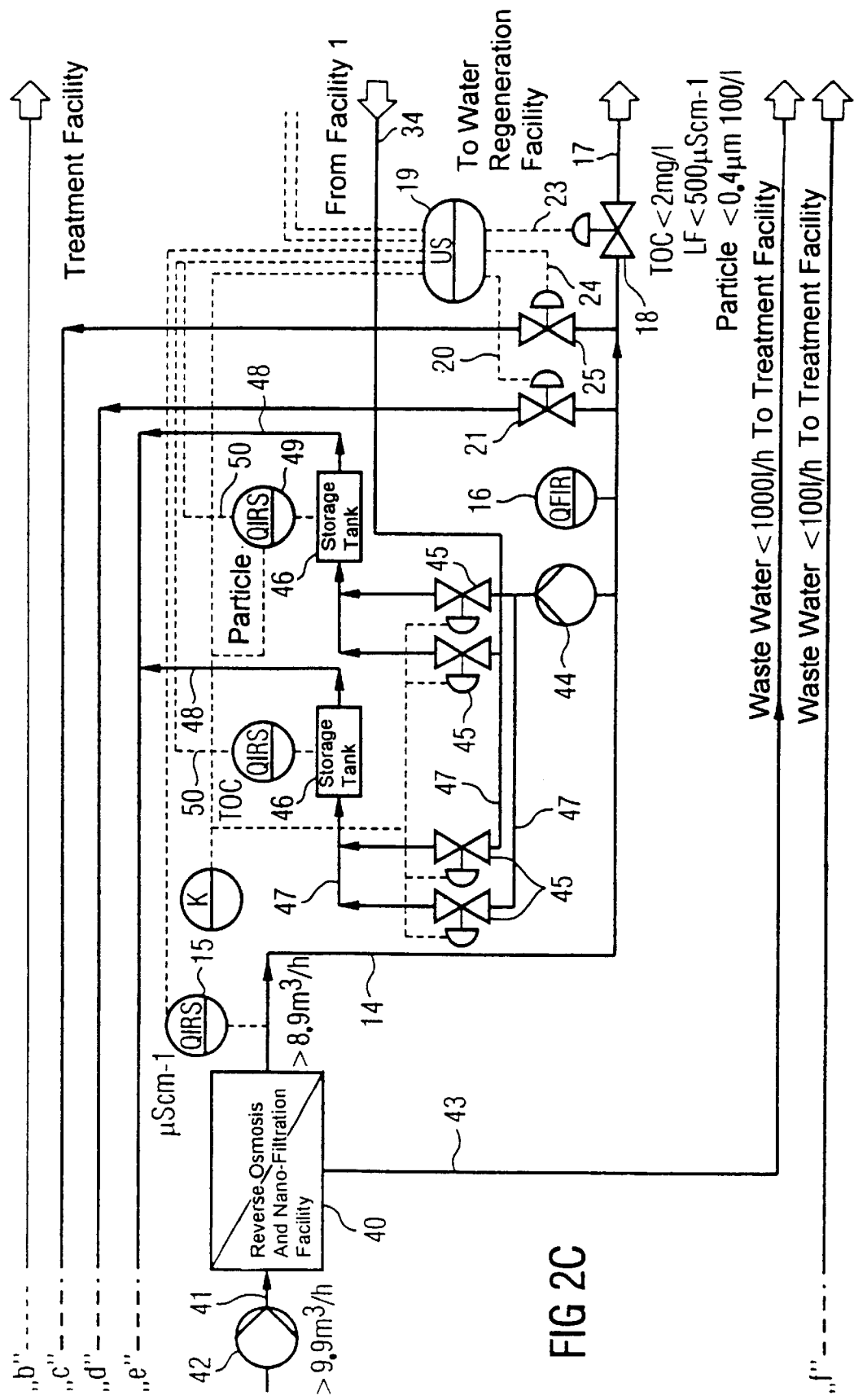

It is also provided that part of the wastewater purified in the ultra-filtration facility 12 can be drawn off from the conduit 14 via a pump 33 and an output conduit 34 and can be passed to the CMP wastewater treatment facility shown in FIGS. 2a, 2b, 2c for the purpose of other parameter values being measured and/or for further cleaning.

The CMP wastewater treatment facility of FIGS. 1a, 1b is configured for a CMP wastewater production of about 20 $m^3/h$. The purity limits of the purified wastewater in the output conduit 17 that are reached in practice are: conductivity (s) <500 $\mu S/cm$, total organic carbon content (TOC) <3 mg/l, fewer than 100 particles having a diameter of <0.4 $\mu m$ per l. Given an inflow of 20 $m^3/h$ of CMP wastewater in the input conduit 1, less than 200 l/h of wastewater concentrate will be passed on under normal operating conditions via the output conduit 13 for neutralization and sedimentation, while more than 19.8 $m^3/h$—more than 99%—can be passed on, via the output conduit 17, for recycling to be produced as deionized water. This data clearly illustrate the considerable reduction in the amount of water consumed in chemical-mechanical polishing which is achieved by the invention.

The exemplary embodiment of FIGS. 2a, 2b, 2c has been expanded by a reverse-osmosis and/or nano-filtration facility 40, compared with the first exemplary embodiment of FIGS. 1a, 1b. FIGS. 2a, 2b, 2c in combinations schematically show a block diagram of the wastewater treatment apparatus. FIG. 2b connects to FIG. 2a on the right, and FIG. 2c connects to FIG. 2b on the right, the corresponding junctions of the conduits being designated, respectively, by "a", "b", "c", "d", "e", "f".

While the wastewater treatment facility of FIGS. 1a, 1b is configured for CMP wastewaters with low to medium contamination by particles, the wastewater treatment facility of FIGS. 2a, 2b, 2c is additionally suitable for treating CMP wastewaters containing chemical contaminants. In particular, this may involve contamination by arsenic and/or tetramethylammonium hydroxide.

Since the configuration of the apparatus of FIGS. 2a, 2b, 2c is highly similar to the apparatus of FIGS. 1a, 1b, only the differences will be discussed hereinafter; apart from those, the reader is referred to the explanation relating to FIGS. 1a, 1b.

Via the input conduit 1, CMP wastewater containing arsenic and/or tetramethylammonium hydroxide flows into the wastewater treatment facility of FIGS. 2a, 2b, 2c. The entire facility of FIGS. 2a, 2b, 2c is configured for a wastewater throughput of about 10 $m^3/h$. The prepurified wastewater leaving the ultra-filtration facility 12 is passed to the reverse-osmosis and/or nano-filtration facility 40 via a conduit 41 into which a pump 42 is incorporated. The wastewater purified in two stages leaves the reverse-osmosis and/or nano-filtration facility 40 via the conduit 14. The filtered-off concentrate from the ultra-filtration facility 12, the concentrate being produced, under normal operating conditions, at a rate of about 100 l/h, passes via the output conduit 13a into a treatment facility not shown in FIGS. 2a, 2b, 2c. A further neutralization and sedimentation of the filtered-off concentrate takes place in the treatment facility known per se. In the event of non-negligible arsenic fractions still being found in the filtered-off concentrate, an arsenic precipitation may additionally be carried out in a manner known per se.

This treatment facility is also reached, via an output conduit 43, by the filtered-off concentrate and/or the solution, concentrated by reverse-osmosis, from the reverse-osmosis and/or nano-filtration facility 40, which concentrate or solution is produced at a rate of about 1000 l/h under normal operating conditions. In the course of the nano-filtration in the nano-filtration facility 40 of FIGS. 2a, 2b, 2c, essentially all the particles having a diameter of more than 0.05 $\mu m$ are filtered out.

The same treatment facility may also be reached, via the set of pumps 28 and an output conduit 29a, by CMP wastewater from the storage tank 27.

The invention further envisages that the conduit 14 is connected to a sampling pump 44. The sampling pump 44 draws small amounts of wastewater purified in two stages from the conduit 14 and returns the test water via valves 45, intermediate storage tank 46 and conduits 47, 48 back to the feed tank 7. Connected to the intermediate storage tanks 46 are sensors 49 that carry out on-line measurements of the total organic carbon content (TOC) and of the number of particles. These measured values, together with the conductivity value of the wastewater in the conduit 14, measured by the measuring sensor 16 and the control system sensor 15, are relayed via signal lines 50 to the converter actuator 19 for evaluation.

Also debouching into the conduit 47 is the conduit 34 from the pump 33 of the wastewater treatment facility of FIGS. 1a, 1b, so that the ultra-filtrated wastewater in the output conduit 17 in the facility of FIGS. 1a, 1b can be tested, if required, by the sensors 49 for its total organic carbon content and particle content.

The wastewater treatment facility of FIGS. 2a, 2b, 2c allows—beyond the limits achievable by the facility of FIGS. 1a, 1b—a total organic carbon content (TOC) of less than 2 mg/l to be achieved in the CMP wastewater, purified in two stages, in the output conduit 17 of FIGS. 2a, 2b, 2c. Of the CMP wastewaters flowing in at about 10 $m^3/h$, about 8.9 $m^3/h$ are returned again in the facility of FIGS. 2a, 2b, 2c, via the output conduit 17, to the regeneration facility for deionized water and are recycled, only about 1.1 $m^3/h$ being removed for the cycle and being passed on to the treatment facility for neutralization and sedimentation.

We claim:

1. An apparatus for treating wastewater from a chemical-mechanical polishing process used in chip fabrication, the wastewater containing particles having an abrasive effect and chemically active substances, comprising:

an ultra-filtration facility receiving the wastewater and filtering out the particles having the abrasive effect without a substantial dissolution of the particles by the chemically active substances and resulting in ultrafiltrated wastewater;

a device for flushing out the particles filtered out in said ultra-filtration facility at sufficiently short intervals so that the particles retained in the ultra-filtration facility are not substantially dissolved by the chemically active substances present in the wastewater, at least one sensor for measuring at least one parameter value of the wastewater after it has passed through said ultrafiltration facility; and a control system operable for selectively passing on the wastewater which has passed through the ultrafiltration facility to either one, both or neither of a reverse-osmosis facility and a micro-filtration facility.

2. The apparatus according to claim 1, including said reverse-osmosis facility disposed downstream of said ultra-filtration facility.

3. The apparatus according to claim 2, including said nano-filtration facility disposed downstream of said ultra-filtration facility.

4. The apparatus according to claim 1, including a regeneration facility disposed downstream of said ultra-filtration facility, said regeneration facility producing deionized water from the ultrafiltrated wastewater.

* * * * *